(12) United States Patent
Voticky et al.

(10) Patent No.: US 7,961,853 B2
(45) Date of Patent: *Jun. 14, 2011

(54) SYSTEM AND METHOD FOR PRIORITIZING COMMUNICATIONS MESSAGES

(75) Inventors: Michael Voticky, Austin, TX (US); Joe Connor, Boca Raton, FL (US)

(73) Assignee: S.F. IP Properties 30 LLC, Wilmington, DE (US)

( * ) Notice: Subject to any disclaimer, the term of this patent is extended or adjusted under 35 U.S.C. 154(b) by 1128 days.

This patent is subject to a terminal disclaimer.

(21) Appl. No.: 11/417,817

(22) Filed: May 4, 2006

(65) Prior Publication Data
US 2007/0036301 A1   Feb. 15, 2007

Related U.S. Application Data

(63) Continuation-in-part of application No. 09/548,201, filed on Apr. 13, 2000, now abandoned, and a continuation-in-part of application No. 09/224,148, filed on Dec. 31, 1998, now Pat. No. 6,351,764.

(51) Int. Cl.
*H04M 1/64* (2006.01)
*G06F 15/16* (2006.01)

(52) U.S. Cl. .................. 379/88.23; 709/207

(58) Field of Classification Search ............ 379/90.01, 379/93.01, 93.24, 88.23; 709/206–207; 340/5.52
See application file for complete search history.

(56) References Cited

U.S. PATENT DOCUMENTS

| | | | |
|---|---|---|---|
| 5,229,764 A | 7/1993 | Matchett et al. | |
| 5,377,354 A * | 12/1994 | Scannell et al. | 718/103 |
| 5,646,839 A | 7/1997 | Katz | |
| 5,745,591 A | 4/1998 | Feldman | |
| 5,748,709 A | 5/1998 | Sheerin | |
| 5,751,835 A | 5/1998 | Topping et al. | |
| 5,757,891 A | 5/1998 | Wang | |
| 5,883,942 A | 3/1999 | Lim et al. | |
| 5,966,351 A | 10/1999 | Carleton et al. | |
| 5,974,414 A | 10/1999 | Stanczak et al. | |
| 5,999,932 A | 12/1999 | Paul | |
| 6,301,608 B1 * | 10/2001 | Rochkind | 709/206 |
| 6,327,343 B1 | 12/2001 | Epstein et al. | |
| 6,351,764 B1 | 2/2002 | Voticky et al. | |
| 6,408,068 B1 | 6/2002 | Larson et al. | |

(Continued)

FOREIGN PATENT DOCUMENTS
EP   0420779 A2   4/1991

(Continued)

OTHER PUBLICATIONS

Search Report, mailed Jul. 6, 2000 for application PCT/US99/29777.

(Continued)

*Primary Examiner* — Gerald Gauthier
*Assistant Examiner* — Mohammad Islam
(74) *Attorney, Agent, or Firm* — Schwabe, Williamson & Wyatt

(57) ABSTRACT

A method of sorting a received information message in which a source of delivery of the message is indicated by a unique identifier accompanying the message, for example, in an e-mail or voice message system. The method includes steps of receiving the message, looking-up the identifier in a database, assigning a code for the message per the result of the step of looking-up, and prioritizing or forwarding the message according to the code.

24 Claims, 14 Drawing Sheets

U.S. PATENT DOCUMENTS

| | | | |
|---|---|---|---|
| 6,871,217 B2 * | 3/2005 | Voticky et al. | 709/207 |
| 7,221,742 B1 * | 5/2007 | Baker et al. | 379/88.23 |

FOREIGN PATENT DOCUMENTS

| | | | |
|---|---|---|---|
| EP | 0588101 | A3 | 8/1993 |
| EP | 0825752 | A3 | 2/1998 |
| WO | 9916217 | | 4/1999 |

OTHER PUBLICATIONS

Office Action, mailed Oct. 24, 2000 for U.S. Appl. No. 09/224,148.
Search Report, mailed Jun. 15, 2001 for application PCT/US01/12192.
Office Action, mailed Jul. 18, 2001 for U.S. Appl. No. 09/548,201.
Office Action, mailed Apr. 10, 2002 for U.S. Appl. No. 09/548,201.
Office Action, mailed Dec. 11, 2002 for U.S. Appl. No. 09/548,201.
Office Action, mailed Jul. 1, 2003 for U.S. Appl. No. 09/548,201.
Office Action, mailed Jan. 15, 2004 for U.S. Appl. No. 09/683,315.
Office Action, mailed Mar. 8, 2004 for U.S. Appl. No. 09/548,201.
Office Action, mailed Jul. 13, 2004 for U.S. Appl. No. 09/548,201.
Notice of Allowability, mailed Sep. 30, 2004 for U.S. Appl. No. 09/224,148.
Office Action, mailed Mar. 11, 2005 for U.S. Appl. No. 09/548,201.
Office Action, mailed Jan. 4, 2007 for U.S. Appl. No. 11/046,276.
EP Office Action, mailed Apr. 24, 2007 for application EP 99967328.8.
EP Office Action, mailed Jan. 22, 2008 for application EP 99967328.8.
Callegra, CallegraDesk for Microsoft Outlook/Exchange, Aug. 1998, pp. 1-6.
Sue Mosher, Using Outlook's Rules Wizard and Assistant's, Online retrieved on Apr. 4, 2002, www.windowsitlibrary.com/Content/191/toc.html.
Final Office Action, mailed Nov. 4, 2005, for U.S. Appl. No. 09/548,201.
Supplemental Search Report, mailed Jun. 19, 2009, for EP Patent Application 01925022.4.
Office Action, mailed Jun. 25, 2009, for CA Patent Application 2406413.
Office Action, mailed Sep. 9, 2008, for CA Patent Application 2356483.
Office Action, mailed Nov. 4, 2009 for Canadian Patent Application 2356483.
Office Action, mailed Mar. 18, 2010 for EP Patent Application 01925022.4, 4 pages.
Office Action, mailed May 27, 2010 for Canadian Patent Application 2406419, 3 pages.

* cited by examiner

| Priority | Sender | Subject Line | Date | Time |
|---|---|---|---|---|
| A | jkendel@ddr.com | Project report | 9/10/98 | 1:22pm |
| B | rsmith@ddr.com | Meeting | 9/10/98 | 8:16am |
| B | d.w.doke@xcrt.com | Order confirmation | 9/10/98 | 4:51pm |
| B | pisle@ddr.com | Quick question... | 9/10/98 | 7:37pm |
| C | rrobertson@att.com | Service details | 9/10/98 | 9:49am |
| C | rkdoyle@bus.uh.edu | Thank you for the interview.... | 9/10/98 | 10:12am |
| C | flee@naeyc.com | Delphi project summary | 9/10/98 | 2:13pm |
| C | rrobertson@att.com | More service details | 9/10/98 | 5:12pm |
| X | deals@buyme.com | Great deals! All the time! | 9/10/98 | 9:02am |
| X | fatcat@theking.net | Yet another good joke! | 9/10/98 | 11:12am |
| | | | | |
| | | | | |

Fig. 4

| Priority | Sender | Subject Line | Date | Time |
|---|---|---|---|---|
| A | jkendel@ddr.com | Project report | 9/10/98 | 1:22pm |
| A | d.w.dole@xert.com | Urgent! Executive order revised! | 9/11/98 | 2:41am |
| B | rsmith@ddr.com | Meeting | 9/10/98 | 8:16am |
| B | d.w.dole@xert.com | Order confirmation | 9/10/98 | 4:51pm |
| B | pjsle@ddr.com | Quick question… | 9/10/98 | 7:37pm |
| B | rsmith@ddr.com | Meeting rescheduled… | 9/10/98 | 10:01pm |
| C | rrobertson@att.com | Service details | 9/10/98 | 9:49am |
| C | rkdoyle@bus.uh.edu | Thank you for the interview… | 9/10/98 | 10:12am |
| C | flee@nacyc.com | Delphi project summary | 9/10/98 | 2:13pm |
| C | rrobertson@att.com | More service details | 9/10/98 | 5:12pm |
| X | deals@buymc.com | Great deals! All the time! | 9/10/98 | 9:02am |
| X | fatcat@theking.net | Yet another good joke! | 9/10/98 | 11:12am |
| X | web1@mags.com | 80% off of ALL magazines! | 9/10/98 | 11:42pm |

Fig. 6

| | SENDER | SUBJECT LINE | DATE | TIME | PRIORITY |
|---|---|---|---|---|---|
| 452 | rsmith@hotmail.com | See you in September? | 9/10/98 | 10:01pm | K |
| 454 | web1@mags.com | 80% off of ALL magazines! | 9/10/98 | 11:42pm | Z |
| 456 | d.w.dole@xert.com | Urgent! Executive order revised! | 9/11/98 | 2:41am | J |

| | SENDER | SUBJECT LINE | DATE | TIME | PRIORITY |
|---|---|---|---|---|---|
| 452 | rsmith@hotmail.com | See you in September? | 9/10/98 | 10:01pm | K |
| 454 | web1@mags.com | 80% off of ALL magazines! | 9/10/98 | 11:42pm | Z |
| 456 | d.w.dole@xcrt.com | Urgent! Executive order revised! | 9/11/98 | 2:41am | J |

Single Character Priority Alpha-Numeric Code (PAC)

Set of personalized Identifiers

| 0 | C | I | O | U |
|---|---|---|---|---|
| 1 | D | J | P | V |
| 2 | E | K | Q | W |
| 3 | F | L | R | X |
| 4 | G | M | S | Y |
| 5 | H | N | T | Z |
| 6 | | | | |
| 7 | | | | |
| 8 | | | | |
| 9 | | | | |
| A | | | | |
| B | | | | |

Fig. 13

Fig. 14 — Two-Character Priority Alpha-Numeric Code (PAC): Set of personalized Identifiers

SYSTEM AND METHOD FOR PRIORITIZING COMMUNICATIONS MESSAGES

CROSS-REFERENCE TO RELATED APPLICATIONS

The present application is a Continuation-In-Part, related to and claiming the benefit of the filing dates of the following applications with a common inventor, which are hereby incorporated by reference:
application Ser. No. 09/224,148, now U.S. Pat. No. 6,351, 764, filed Dec. 31, 1998, entitled "System and Method for Prioritizing Communications Messages;" and
U.S. patent application Ser. No. 09/548,201, filed Apr. 13, 2000 now abandoned, entitled "Communications Prioritizer."

TECHNICAL FIELD

The present invention relates to information technologies and communications systems. In one aspect, the present invention relates to systems and methods for Prioritizing communications, including but not limited to the prioritization of e-mail, voicemail, and facsimile messages, based upon pre-selected parameters.

BACKGROUND OF THE INVENTION

Communications and information technologies systems and processes are attracting significant attention and innovation. The many new developments and venues for communications and information transfers, particularly in regard to electronic communications message systems, are fast becoming overwhelmed due to the rapidly increasing number of exchanges between communicators. Three of the most commonly used electronic communications message systems include electronic mail ("e-mail"), telecommunication voice messages ("voicemail"), and facsimile transmissions ("facsimiles"), and all three have become increasingly complex over time and are undoubtedly going to become even more complex and voluminous in the future. Consequently, e-mail, voicemail, and facsimiles, which were once expected to increase individual productivity, have begun to erode productivity because the effort required to manage the increasing volume of communications has become too challenging and time-consuming.

For example, in regard to e-mail, "spam" messages and other widely transmitted and broadcasted but unimportant and undesired informational communications are becoming more and more problematic because they increase the effort required by a typical e-mail recipient to personally prioritize the numerous messages of varying importance in order to separate the "wheat" of good messages from the "chaff" of undesired or unimportant messages. In conventional systems, prioritizing, sorting, segregating, or otherwise acting upon or in response to (hereinafter referred to simply as "prioritizing") received e-mail messages requires the recipient to determine priority "on the fly" for each e-mail message, which in turn requires that each and every message be viewed or read to some extent—a highly inefficient process. A similar analysis also applies to voicemail messages and, to a lesser extent, facsimile messages which likewise accumulate and which must be separately prioritized through the user's active involvement.

While selected e-mail systems use "filters" to help alleviate the aforementioned problem, most if not all are very limited, inefficient, and largely ineffective. For example, e-mail filters maintained at the server computer act to prevent certain undesired e-mail messages from ever reaching the intended recipient. These filters are typically comprised of special computer instructions (software) that blindly identifies specific words and/or characteristics of an incoming message and systematically discards those specific messages so that they are never downloaded by nor are even accessible to the end-user recipient. These systems are generally inflexible, cannot be easily customized, and generally are limited to either accepting, deleting, or redirecting an incoming message. As for voicemail, facsimile, and other communications applications, even these simple, ineffective filters do not generally exist.

Given the increasing quantity of electronic communications, these conventional filtering mechanisms, and particularly those residing and maintained apart from the end-user, are problematic and ineffective at best and thus are not widely used. Consequently, most recipients of these electronic messages have little choice but to actively review each and every message personally and prioritize or, for unwanted messages, discard altogether each message individually. Existing filtering systems do not adequately address these problems because they operate largely without regard to the preferences or appropriateness of such filtering in regard to specific recipients. For example, the intended recipient may in fact desire to receive certain messages that are in fact being discarded or otherwise prioritized in an inappropriate manner regarding that particular recipient user, or the intended recipient may receive messages that the recipient does not want to receive but which are not precluded by the filtering system. Existing filtering systems afford message recipient with little or no ability to change or vary priorities and associated discrimination characteristics, much less do so "on the fly" to provide specific, unique, and personalized prioritization.

SUMMARY OF THE INVENTION

The solution to communications overload provided in accordance with the present invention is to put more control into the hands of end-users and provide end-users with powerful tools to prioritize incoming communications. The present invention enables message recipients or a designee, such as the electronic communications service provider, to automatically prioritize incoming messages based on broad pre-selected parameters. This new and innovative technology has the potential to revolutionize communication services, including those services involving voicemail, e-mail, and facsimile. The present invention may also be readily extended to other forms of message communication, including but not limited to "hybrid messaging" such as facsimiles converted into e-mail messages which may or may not include an attached graphics file, voicemail messages converted into e-mail messages which may or may not include an attached digital sound file, e-mail messages converted into voicemail messages, and e-mail messages converted into facsimiles, as well as web-based e-mail messaging applications, analog and digital pager applications, analog and digital mobile (cellular) phone applications, interactive cable programming applications, laser transmissions, satellite communications, and other individualized communication services. For all of these reasons, and in light of the plethora of applications to modem and futuristic communications technologies, the advantages presented by the present invention are significant to both the technology and the art.

An embodiment of the present invention is a method for an electronic communication prioritization system to prioritize a received information message, including but not limited to e-mail messages, voicemail messages, facsimile messages, and any combinations or permutations thereof, by determining the originating source (the "sender") of the message that is by some means identified by a personalized identifier accompanying or embodied in the message. The method includes the elements of determining a personalized identifier for a received message, comparing the personalized identifier from the message against an informational database, assigning a priority code to the message based on the priority corresponding to the personalized identifier as indicated in the database, and prioritizing the message based on the assigned priority code. In addition, the method is implemented with respect to multiple mailboxes, which themselves may be prioritized, such that different prioritization criteria may be applied to different mailboxes.

Another embodiment of the invention is a system for prioritizing a received information message where the originating source (the "sender") of the message is indicated by a personalized identifier corresponding to the message. The system includes a database maintaining known personalized identifiers and the desired priority codes corresponding to these known identifiers, as well as one or more priority codes corresponding to unknown personalized identifiers and/or non-personalized messages. The system further includes a system for determining a personalized identifier for that message, a system for matching the personalized identifier to a database to derive the appropriate priority code, a system for assigning the priority code to the message based on the priority corresponding to the personalized identifier, and a system for prioritizing the message based on the priority code.

Another embodiment of the invention is a computer-readable medium of data and/or instructions. The computer-readable medium of data and/or instructions includes a message, a personalized identifier associated with the message or a means by which the personalized identifier can be determined from the message, computer instructions for receiving the message and the personalized identifier, a database containing known identifiers and desired priority codes corresponding to the known identifiers, computer instructions for cross-referencing the database with the personalized identifier to determine a desired priority code, computer instructions to assign the priority code to the message based on the priority corresponding to the personalized identifier, and computer instructions to prioritize the message based on the priority code.

In all of the possible embodiments of the present invention, including the foregoing embodiments, the term "prioritization" expressly includes all possible subsequent actions that could be taken in response to the receipt of the message, such as prioritizing, sorting, segregating, forwarding, deleting, modifying, replying, or otherwise acting upon or in response to the personalized identifiers and the resulting priority code. For example, an embodiment of the present invention could, as part of the prioritization of the message, automatically reply with a specific response message to the specific known sender of the received message before, during, or after said receipt. In the context of e-mail, and by way of example only, this response-prioritization might be an auto-response message to a specific known sender to let the sender know that the user is out of town. In the context of voicemail, and by way of example only, the prioritization response might be a customized recorded greeting for the known sender that is played before the sender leaves the voicemail message. A myriad of other actions and reactions are also possible and are expressly included as elements of "prioritization" as that term is used herein.

Likewise, in all of the possible embodiments of the present invention, including the foregoing embodiments, numerous and varied potential personalized identifiers could be used. For example, possible personalized identifiers for e-mail messages include without limitation the sender's "return address" (e.g., sender@.domain.com); an internet protocol (IP) associated with an email or other type of message transmitted over a network, a personalized identification in the "subject" line or other location within the message that is known and held in confidence by both the sender and the recipient such as a personal identification number (PIN) or, as later defined herein, a PAC; a "trusted" third-party verification of identity in some form or manner such as used in certain electronic commercial transactions; an identification file in some format that is included, embodied, or otherwise attached to (collectively, "associated with") the message; the personalized elements inherent to the format of the incoming message itself (its "inherent characteristics"); the machine number for the sender server; the path origin information specifying the geographic or physical path over which the message was transmitted; or identification by any other authentication means known by those with skill in the art. Similarly for voicemail messages and facsimile messages, examples of possible personalized identifiers include without limitation the sender's "Caller-ID" (the identifying phone number of the originating source), an IP address associated with the message, messaging or billing data associated with a particular call, or a personalized identification code known held in confidence by both the sender and the recipient such as a PIN or PAC and keyed-in or spoken by the sender. Furthermore, personalized identifiers may also be unilaterally derived from the inherently personalized elements of certain kinds of messages, including but not limited to using voice recognition technology (specifically, a "voiceprint") to identify the sender of voicemail messages—which, in this case, does not require the knowledge nor special participation by the sender in the prioritization processor the sending station identification that is part of a facsimile message transmission. In a similar manner, the present invention also included embodiments based on other personalized means of identification and verification, commonly known as "biometric signature technologies," that, with appropriate technological means, could also be incorporated as personalized identifiers, such means including without limitation the following: voice recognition; voiceprints; optical scans and/or iris-prints; DNA scans including without limitation those using blood, hair, skin cells, and so forth; face recognition; typing patterns at, for example, a keyboard or numeric entry pad; hand geometry; palm-print(s); fingerprint(s) (including thunbprint(s)); and all elements of signature geometry, which comprise not just the physical appearance of the signature, but also elements related to pen pressure, signature speed, acceleration and deceleration patterns, looping, edging, and so forth.

The "personalized" element of any of the aforementioned personalized identifiers is not limited or confined to individual persons, but can be personalized as to broad categories of individuals, or personalized as to specific instances for a specific individual, thereby spanning the entire range of prioritization. In regard to the former instance of broad categories ("categories"), and by way of an unlimited example only, e-mail messages may be identified solely based on the domain of the sender or group of senders, for example, all e-mails received from persons using a HotMail address (users@hotmail.com). In regard to the latter instance of very narrow categories, and again by way of an unlimited example only, a specific individual (the sender) may be invited to send a voicemail message—which, for example, may be in response to an inquiry sent by the user to that party-in which the sender of the message is directed to use a one-time numeric identification number, such as one entered by a touch-tone phone, to be inserted at the beginning of the message and which, once used, is automatically precluded from being re-used by the sender again thereafter. As denoted by these examples, the present invention is intended to include and claim all possible ranges of specificity in the degree of uniqueness from the broadest application or "categorization" to the narrowest "instance" without any limitations whatsoever.

Finally, nothing in this description of the invention is intended to convey any limitation on the applicability of the present invention in regard to any division or separation between traditionally separate messaging means. In this regard, multi-message-systems such as systems that consolidate messages from varying message sources—e.g., consolidating e-mail, voicemail, facsimile, and other messages-into a single system of a single message type or multiple message types, can implement the present invention without regard to the originating message type or, alternately, may use the message type as an additional dimensional parameter in the prioritization scheme implemented by the present invention.

BRIEF DESCRIPTION OF THE FIGURES

A better understanding of the present invention can be obtained when the following detailed description of the disclosed embodiments is considered in conjunction with the following figures, in which:

FIG. 4 illustrates an exemplary screen image, as presented on the message recipient's computer system, of prioritized messages residing in a single virtual mailbox in sorted order.

FIG. 6 illustrates the sorting and placement of the three messages into the virtual mailbox of FIG. 4 in accordance with the priorities of the new messages relative to the priorities of the existing messages.

FIG. 8 illustrates three additional incoming messages received at the times indicated and with the associated priorities determined by the prioritization system.

FIG. 11 illustrates the three additional incoming messages received at the times indicated and with the associated priorities determined by the prioritization system.

FIG. 13 illustrates the set of personalized identifiers available from using a single character priority alpha-numeric code (PAC).

FIG. 14 illustrates the set of personalized identifiers available from using a two-character priority alpha-numeric code (PAC).

DETAILED DESCRIPTION OF THE FIGURES

Figure 1:
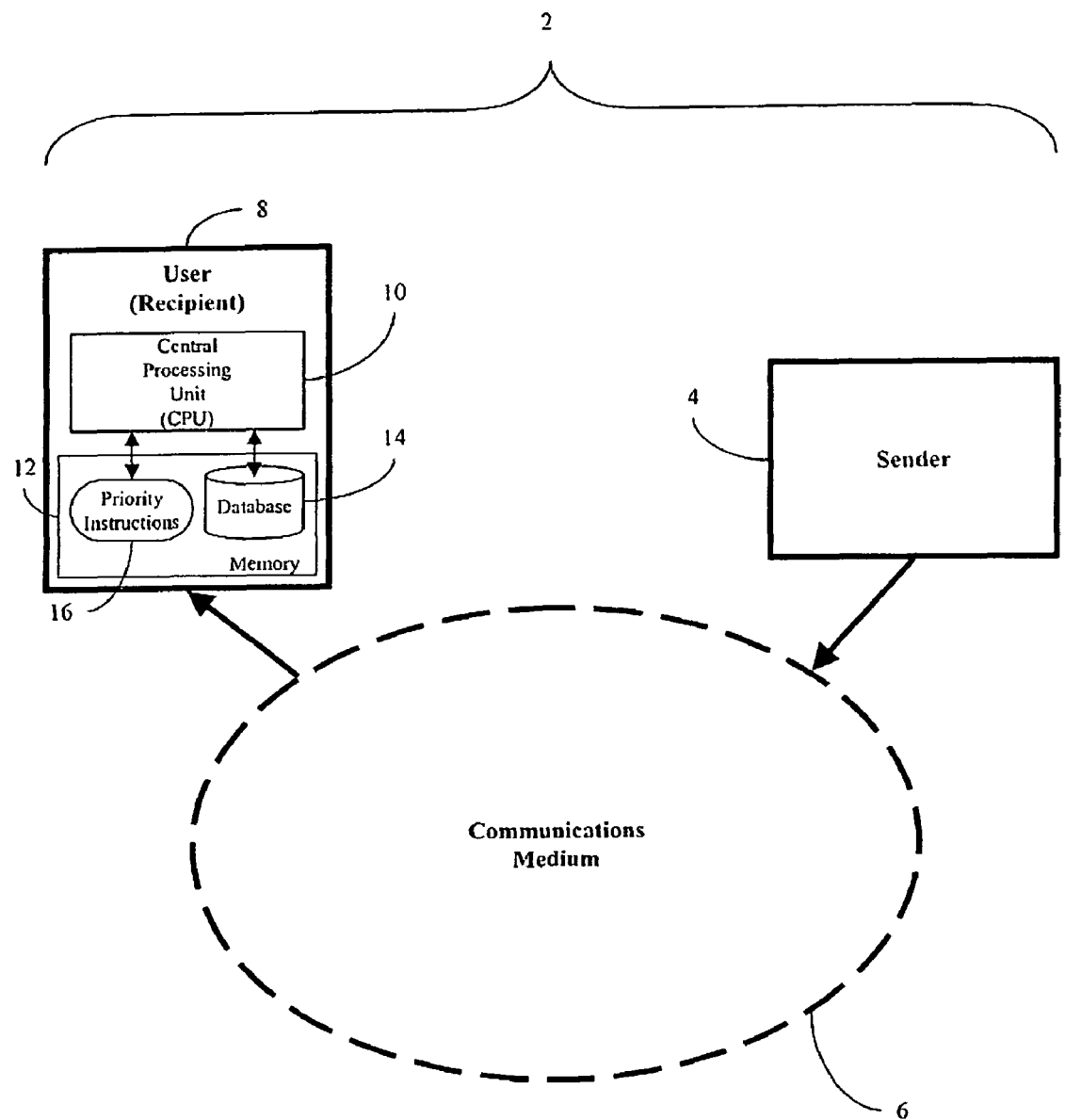
FIG. 1 illustrates a communication system for a message across a communications medium, wherein said communications system includes a sender, the communications medium, and a user who is the recipient of the message.

FIG. 1 illustrates a communication system 2 for a message across a communications medium 6 wherein said communications system 2 includes a sender 4, a communications medium 6, and a user 8 who is the recipient of the message. Without limitation, the communications medium 6 may be an electronic communications network, such as a telecommunications network (e.g., the Internet), a local area network (LAN), a wide area network (WAN), a wireless network (e.g., cellular, pager, etc.), a switchboard, or any other type of communications medium, including the associated interconnection, switching, routing, and other communications elements of a conventional communications network structure. The sender 4 and the user 8 are both connected to the communications medium 6, or they may be connected directly together, or both. The communications system 2 operates in a conventional manner. Communications between the sender 4 and the user 8 (the recipient) travel across the communication medium 6.

The prioritization system of the present invention may be located with the user 8 and might not be part of the communications medium 6. The prioritization system comprises software or hardware for prioritizing messages received by the user 8. In one embodiment, a central processing unit 10 (CPU) processes incoming messages in accordance with information maintained in the priority instructions 16 and the database 14, both of which are maintained in memory 10 that are part of the user 8.

Figure 2:
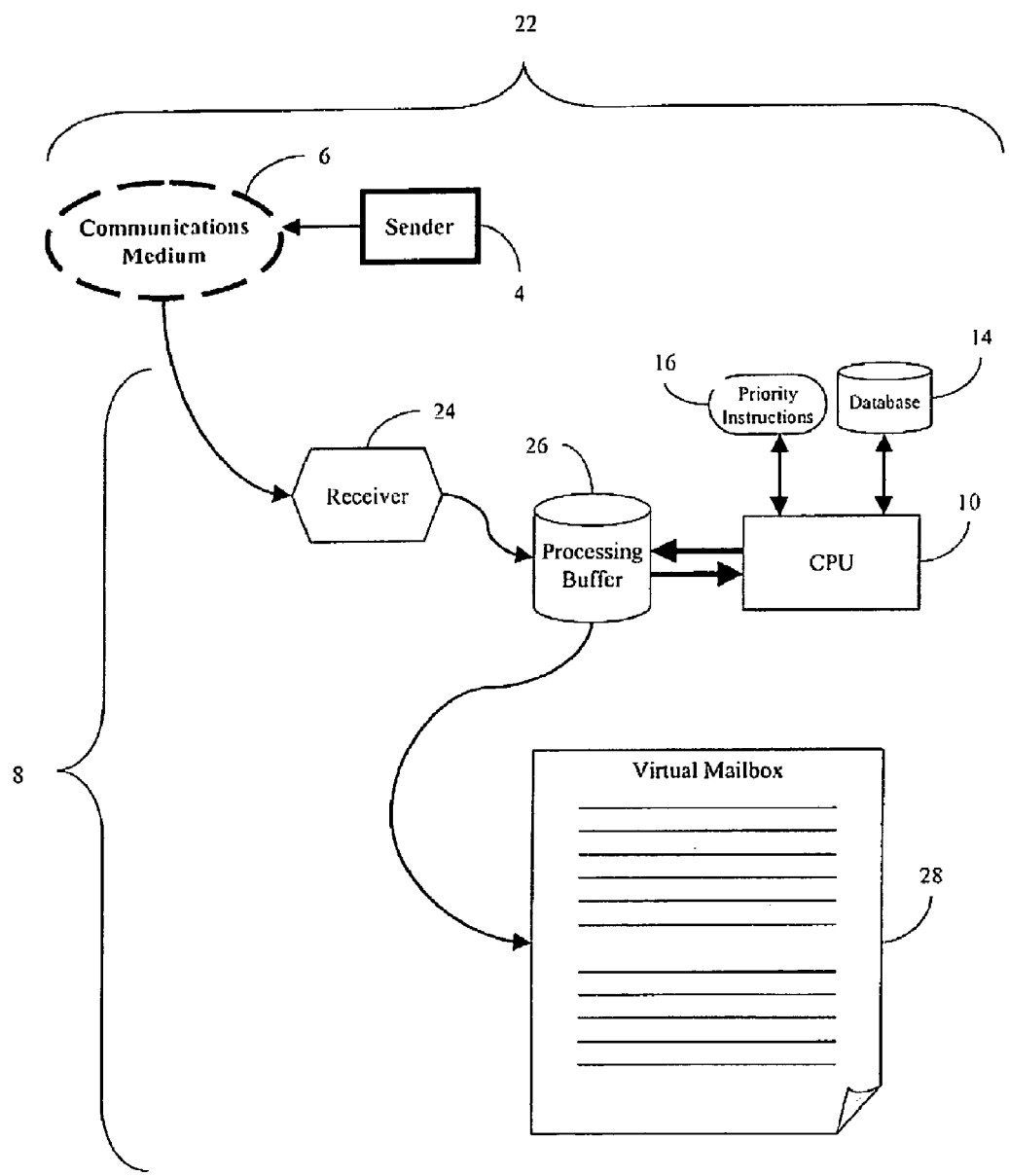
FIG. 2 illustrates a structural representation of the prioritization system in accordance with one embodiment of the present invention.

FIG. 2 illustrates a structural representation of the prioritization system in accordance with one embodiment of the present invention. In this embodiment, a message, sent by a sender 4, may be first received or, alternately, retrieved from the communications medium 6 by, the user 8 via a receiver 24, comprising hardware and/or software, and the message may be temporarily maintained in a processing buffer 26. The CPU 10 accesses the priority instructions 16 and, based on the information therein, parses the message to derive the sender's 4 personalized identifier from the message received. Once the sender's 4 personalized identifier is derived—or, if no personalized identifier can be derived, then once a standard identifier is alternately assigned and thereafter treated as a personalized identifier—the CPU 10 then accesses the database 14 to determine the appropriate priority code based on the derived personalized identifier. Once the priority code is determined, this code may then be associated with the message by the CPU 10 and the message may then be removed from the processing buffer 26 and prioritized in the appropriate virtual message box 28 position in accordance with its assigned priority.

Figure 3:
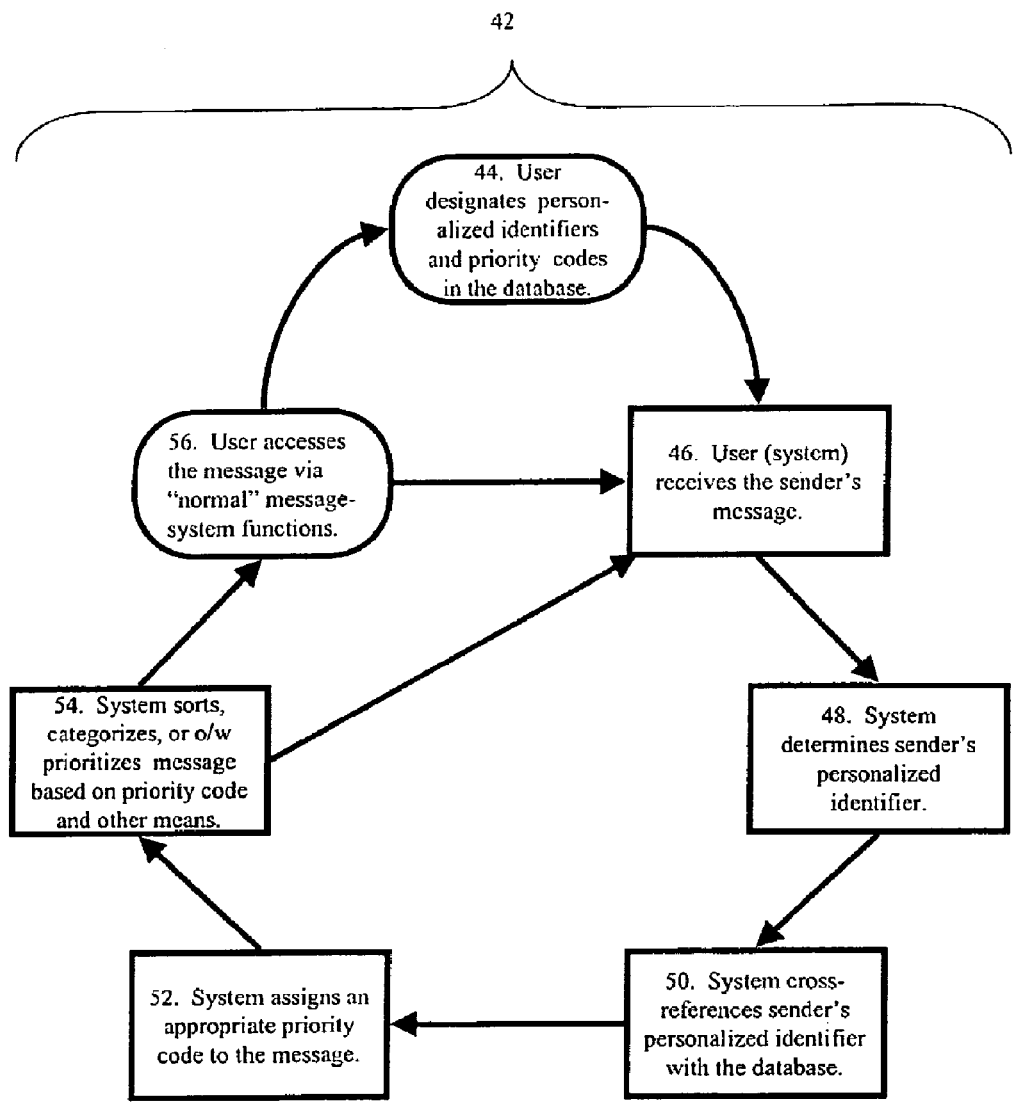
FIG. 3 illustrates a flowchart representation of the operation of the automated message prioritization system in accordance with one embodiment of the present invention.

FIG. 3 represents a flowchart representation of the operation of the automated message prioritization system in accordance with an embodiment of the present invention. In the method 42, a user 8 develops the priority database 14 in FIG. 1 by designating personalized identifiers and associated priority codes for the software and hardware of the present invention (instance 44). The database 14 developed in instance 44 may be any conventional database that allows for custom prioritization among database elements or interaction between the database and additional customized software that performs such prioritization of elements of the database 14. The data entered into the database 14 itself includes personalized identifiers for known or expected senders of messages that the user 8 expects to receive from potential senders via the communications medium 6. For example, in the specific case of e-mail messages to be received by a user 8, the data entered in the database 14 may be e-mail address identifiers in the typical e-mail address format of "username@domain.com," internet protocol (IP) addresses, or a category of senders using a common domain in any manifestation incorporating the format of "@domain.com", "@domain.org", etc. Of course, typical e-mail addresses and domains have some variation, and the data entered in the database 14 might correspond with each of those variations, or combinations or permutations thereof, according to those sources from which e-mail messages are expected to be received by the user 8.

The personalized identifier data entered in the database 14 need not include a personalized identifier for every sender 4 from which a message may be received by the user 8, but can include a personalized identifier for a group or category of individual senders 4. For example, the method 42 can provide for prioritization based on a common characteristic of the expected incoming messages. For instance, using method 42 as an example of an e-mail system, the common characteristic could be common e-mail address information such as common domain name or IP address information or other similar characteristics comprising a category. Likewise, for unexpected messages from unknown or unexpected senders, prioritization can be provided by the method 42 in accordance with the desires of the user 8—for instance, a standard priority code that can act as a surrogate personalized priority code. Therefore, even though the database may not include data corresponding to an unexpected e-mail message, that message may still be prioritized according to the dictates of the user 8.

In instance 46, a message may be received by the user 8 of the present invention. The message may be received in the conventional manner for that type of message from the communications medium 6. In instance 48, the system of the present invention, using the CPU 10 of FIG. 1, determines, in accordance with the priority instructions 16 of FIG. 1, the personalized identifier corresponding to the received message or, if there is no personalized identifier, utilizes a standard personalized identifier reserved for messages from unknown senders (i.e., as a surrogate personalized identifier). For e-mail messages, this instance 48 may involve processing the sender's 4 e-mail address, IP address or, alternately, processing a personal identification number of some sort embedded in the message. In a voicemail context, and without limitation, this instance may involve processing a personal identification number keyed-in before, during, or after the message or, alternately and with appropriate technology, conducting a voiceprint analysis, using voice recognition technology, or merely analyzing the Caller-ID information of the sender 4 leaving the message, among many other possibilities.

In instance 50, a lookup operation may be performed by the system of the present invention utilizing software or hardware of said system to cross-reference the sender's 4 personalized identifier determined in instance 48 with the database 14 from FIG. 1. In regard to e-mail messages, the e-mail address of the received e-mail message from the instance 46 might be compared to data indicative of e-mail addresses which are maintained in the database 14. If the e-mail address is found in the database 14, then the priority code found in the database 14 corresponding to that particular e-mail address may be the priority to be given to the received e-mail message. Similarly, if the e-mail address is not found in the addresses which are maintained in the database 14 of the user 8, then the priority code found in the database 14 corresponding to an unlisted e-mail address (i.e., the surrogate personalized priority code) may be the priority to be given to the received e-mail message. Therefore, based on the hardware and software prioritization mechanisms maintained at the user 8, the received e-mail message may then be prioritized according to the code corresponding to the e-mail address, or lack thereof, in accordance with the information entered by the user 8 into the database 14 in instance 44. The assignment of the priority code to a received message occurs in instance 52.

In instance 54, the message received by the user 8 may be deposited in an attendant virtual "messagebox" or "mailbox" 28 which, as these terms are used throughout, apply to collection and maintenance of any form of messages for use by the user 8, including but not limited to e-mail, voicemail, facsimile, and combinations and variations thereof, as well as conversions from one form to another, and these terms are fully equivalent as used herein and are therefore used interchangeably without limitation. In the case of an e-mail system, this virtal mailbox 28 may be maintained at the user 8. The virtual mailbox 28 for any kind of message may be software and/or hardware of the user's 8 system that provides standard, conventional mailbox functions along with additional functionality necessary to prioritize the received message according to the assigned code derived from instance 52.

In instance 56, the software or hardware on the system provides for normal, conventional functions which, in an e-mail context, include but are not limited to "reply," "forward," "copy," "delete," and other myriad functions.

At any point in the method 42, the user 8 may receive additional e-mail messages in instance 46, and a user 8 of the system may also change the priority instructions 12 and/or the data in the database 14 in the instance 44. These changes may include but are not limited to such changes necessary to (a) add "expected" or "known" sender e-mail addresses to the data, (b) change corresponding priority codes, or (c) vary the prioritization then implemented on the prioritization system via the software and/or hardware thereof.

Figure 5:
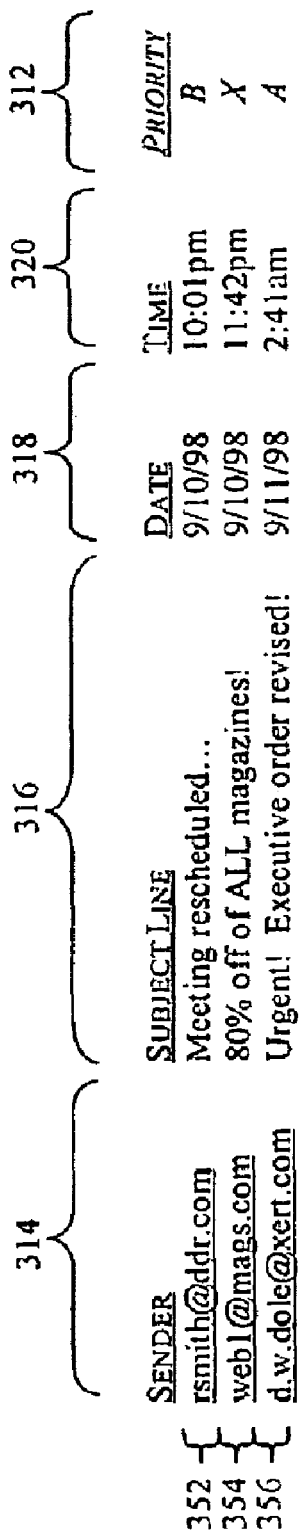
FIG. 5 illustrates three additional incoming messages received at the times indicated and with the associated priorities determined by the prioritization system.

Several schemes of prioritizing are possible via the virual mailbox, as those skilled in the art will understand and appreciate. For example, the received messages may be merely prioritized in a most-important-to-least-important descending order according to the particular assigned priority code, and perhaps further sorted within each priority code designation in accordance with the order each message is received with earlier messages receiving a higher "sorting priority." In this manner, all incoming messages are grouped together in a common mailbox, but the order of the messages might be first determined by the priority code and then further sorted according to the date and time each message is received. By way of example only, FIG. 4 illustrates an exemplary screen image, as presented on the message recipient's computer system, of a prioritized messages residing in a single virtual mailbox in sorted order; FIG. 5 illustrates three additional incoming messages received at the times indicated and, with the associated priorities determined by the prioritization system; and FIG. 6 illustrates the sorting and placement of the three messages into the virtual mailbox of FIG. 4 in accordance with the priorities of the new messages relative to the priorities of the existing messages. In one embodiment, the prioritization scheme of the present system may be based on four levels of priority as follows:

Priority "A"—High Priority
Priority "B"—Intermediate Priority
Priority "C"—LOW Priority
Priority "X"—No Priority (Junk Mail, unknown-origin messages, etc.)

For purposes of this example only, a message from a known source that may be considered by the user 8 to be important may be granted the highest priority "A", whereas a message from a known source that may be considered by the user 8 to be of lesser importance may be granted the intermediate priority of "B". Similarly, a message from a known source that may be considered unimportant to the user 8 may be granted a low priority of "C", whereas a message from an unknown source or from an undesirable known source, such as a known "junk-mailer" or "spam-mailer", might be given the lowest priority of "X."

Referring to FIGS. 4, 5, and 6 collectively, the structure of the virtual mailbox display 310 may be based on columns corresponding to the determined priority 312, the originating sender 314 corresponding to and identifying the sender, the subject line of the message 316, and the date 318 and time 320 the message was received or sent. The old messages 322 already resident in the virtual mailbox are grouped and sorted in accordance with their priority codes 324, 326, 328, and 330—which also correspond to the natural categorization groups for each of the four categories—and are further sorted within each of these groupings based on date 318 and time 320 each message was received or sent. Based on the temporal starting point illustrated at FIG. 4, the first new message 352 of FIG. 5 may be received at 10:01 P.M. on Sep. 10, 1998, may be determined to have a priority of "B" because it may be from a known sender of intermediate priority, and may therefore be placed in the virtual mailbox at position 372 of FIG. 6 (i.e., the bottom of natural group "B") based on its relative priority 312 and the date 318 and time 320 the message 352 is received compared to the previously received messages. The second new message 354 of FIG. 5 may be received at 11:42 P.M. on Sep. 10, 1998, may be determined to have a priority of "X because it may be from an unknown sender or a known spam-mailer, and may therefore be placed in the virtual mailbox at position 374 of FIG. 6, i.e., the bottom of natural group "X which may be also the bottom of the mailbox, based on its relative priority 312 and the date 318 and time 320 the message 354 is received compared to the previously received messages. The third new message 356 of FIG. 5 may be received at 2:41 A.M. on Sep. 11, 1998, may be determined to have a priority of "A" because it may be from a known sender 4 of high priority, and may therefore be placed in the virtual mailbox at position 376 of FIG. 6, i.e., the bottom of natural group "A", based on its relative priority 312 and the date 318 and time 320 the message 356 is received compared to the previously received messages.

Figure 7:
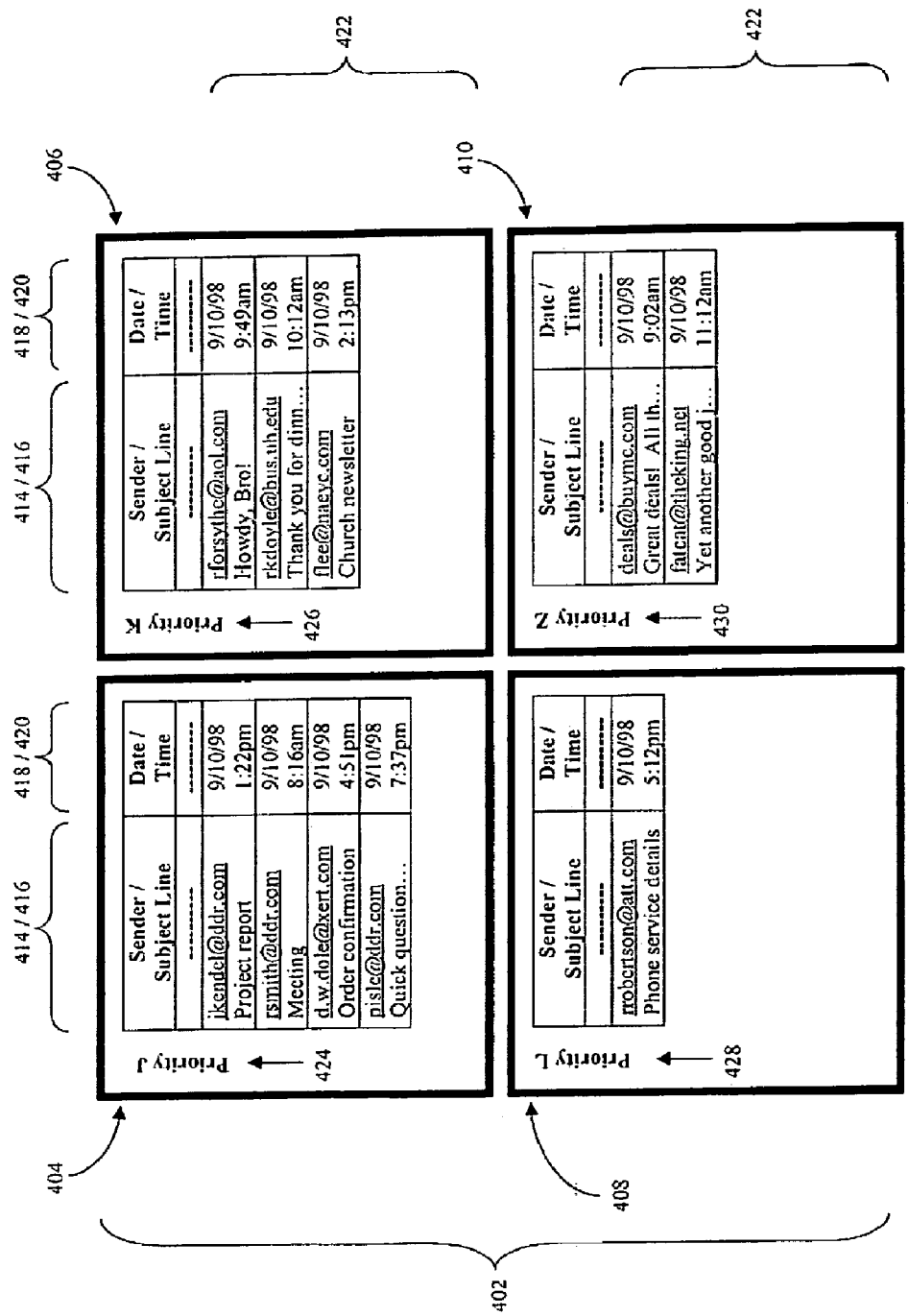
FIG. 7 illustrates an exemplary screen image as presented on the message recipient's (the user's 8) computer system of prioritized messages categorized in a plurality of virtual mailboxes and therein residing in sorted order.
Figure 9:
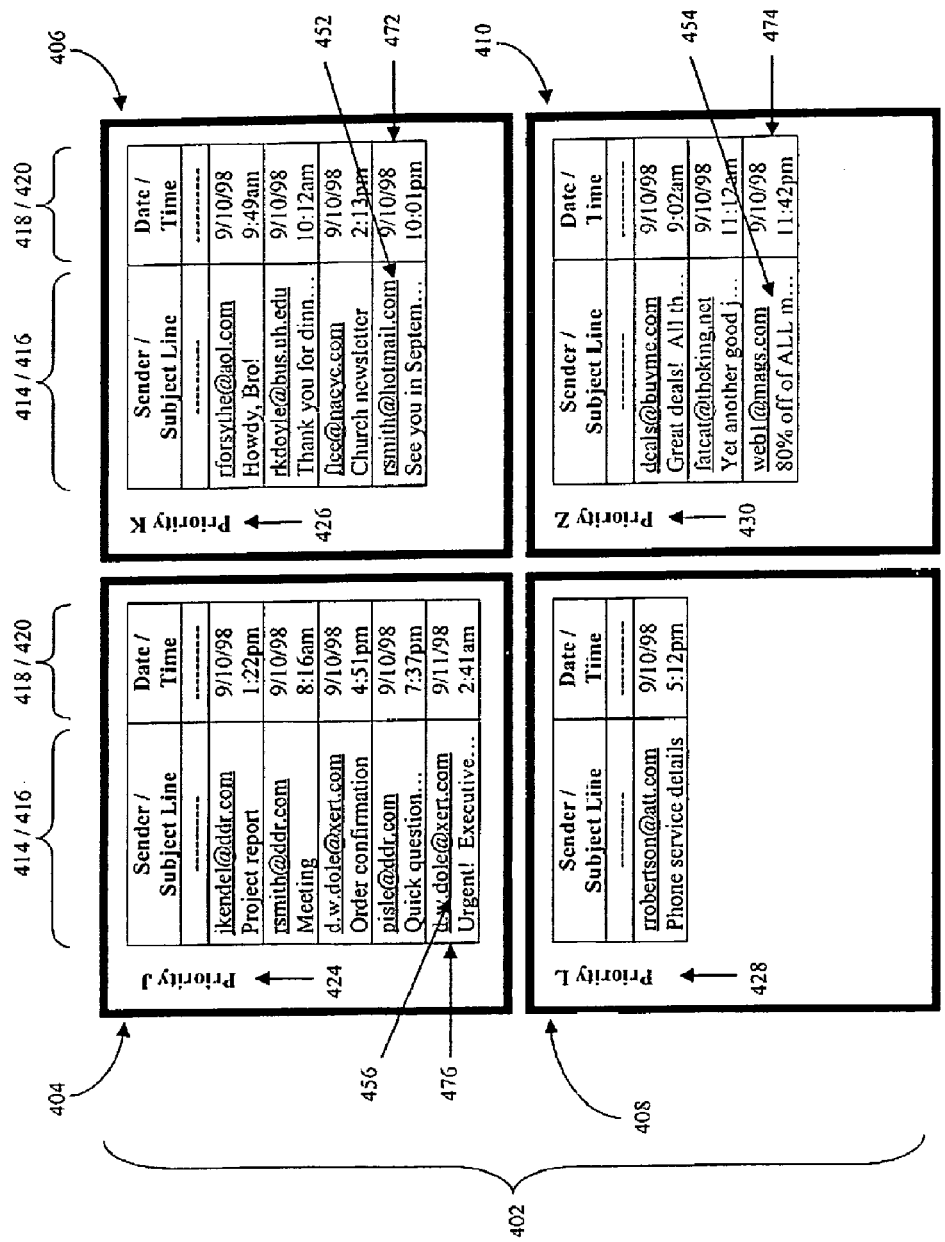
FIG. 9 illustrates the categorization and sorting of the three messages into the virtual mailbox of FIG. 7 in accordance with the categorization priorities of the new messages relative to the categories and priorities of the existing messages.

Alternatively, the received messages may be categorized in more important or less important virtual mailboxes that may be established by the user's 8 prioritization system, which may be the user 8 for e-mail systems of method 42. In this regard, the software and/or the hardware of the user's 8 system allows the user 8 of that system or the user's 8 designee to determine the prioritization and thereby dictate to which particular virtual mailbox incoming messages received by the system should be placed or located. Multiple groups and multiple sorting methods may be combined to produce varied results. In other words, mailboxes may be prioritized in addition to messages. Prioritization need not be limited to one dimension as in the previous examples—.g., most important to least important-but may be multi-dimensional—e.g., four distinct categories of messages such as, office, family, friends, and others-with additional prioritization within each category that may be unrelated to relative prioritization in the other categories. By way of example only, FIG. 7 illustrates an exemplary screen image as presented on the message recipient's (the user's 8) computer system of prioritized messages categorized in a plurality of vial mailboxes, which themselves may be prioritized, and therein residing in sorted order; FIG. 8 illustrates three additional incoming messages received at the times indicated and with the associated priorities determined by the prioritization system; and FIG. 9 illustrates the categorization and sorting of the three messages into the virtual mailbox of FIG. 7 in accordance with the categorization priorities of the new messages relative to the categories and priorities of the existing messages. Similar to the embodiment of the invention described in FIGS. 4, 5, and 6, the prioritization scheme of the present system may be based on four levels of priority categorization as follows:

Priority "J"—Work Priority
Priority "K"—Family and Friends (F&F) Priority
Priority "L"—Non-Work and Non-F&F Priority
Priority "Z"—No Priority (Junk Mail, unknown-origin messages, etc.)

For purposes of this example only, a message associated with the user's 8 "work" may be granted the categorization priority of "J" while a message from "family and friends" may be granted the corresponding categorization priority of "K". Similarly, a message from a known source that does not qualify for categorization in "J" or "K" may be granted a categorization priority of "L"-while a message from an unknown source or from an undesirable known source, such as a known "junk-mailer" or "spam-mailer", might be categorically prioritized into "Z".

Referring to FIGS. 7, 8, and 9 collectively, the structure of each of the four categorical virtual mailboxes 404, 406, 408, and 410 comprising the plurality of categorized virtual mailboxes 402 may be based on columns corresponding to the originating sender 414 corresponding to and identifying the sender, the subject line of the message 416, and the date 418 and time 420 the message was received or sent. The old messages 422 already resident in the virtual mailbox are grouped and sorted in accordance with the four priority codes 424, 426, 428, and 430 corresponding to the four categorical virtual mailboxes 404, 406, 408, and 410, with the messages therein further sorted within each of these categorical virtual mailboxes 404, 406, 408, and 410 based on date 418 and time 420 each message was received. Based on the temporal starting point of FIG. 7, the first new message 452 of FIG. 8 may be received at 10:01 P.M. on Sep. 10, 1998, may be determined to have a priority of "K" because it may be from a family member or friend (F&F), and may therefore be placed in the corresponding categorized virtual mailbox 406 at position 472 of FIG. 9—i.e., the bottom of categorized virtual mailbox "K" 406—based on its relative categorization priority 412 and the date 418 and time 420 the message 452 may be received compared to the same elements of previously received and categorized messages. The second new message 454 of FIG. 8 may be received at 11:42 P.M. on Sep. 10, 1998, may be determined to have a priority of "M" because it may be from an unknown user or a known spam-mailer, and may therefore be placed in the categorized virtual mailbox 410 at position 474 of FIG. 9—i.e., the bottom of categorized virtual mailbox 410 which may be also the bottom of the mailbox "M" 410—based on its relative categorization priority 412 and the date 418 and time 420 the message 454 is received compared to the previously received and categorized messages. The third new message 456 of FIG. 8 may be received at 2:41 A.M. on Sep. 11, 1998, may be determined to have a priority of "J" because it may be from the user's 8 "work" and therefore may be placed in the virtual mailbox at position 476 of FIG. 9—i.e., the bottom of categorized virtual mailbox "J"—based on its relative categorization priority 412 and the date 418 and time 420 the message 456 is received compared to the previously received and categorized messages. Unlike the natural categorization groups of the virtual mailboxes in FIGS. 4, 5, and 6, the virtual mailboxes 404, 406, 408, and 410 of this embodiment may have overlapping priority among the categorized groups such that this second new message 454 may or may not be more important than the first new message 452 or any other message in the first virtual mailbox 404.

Figure 10:
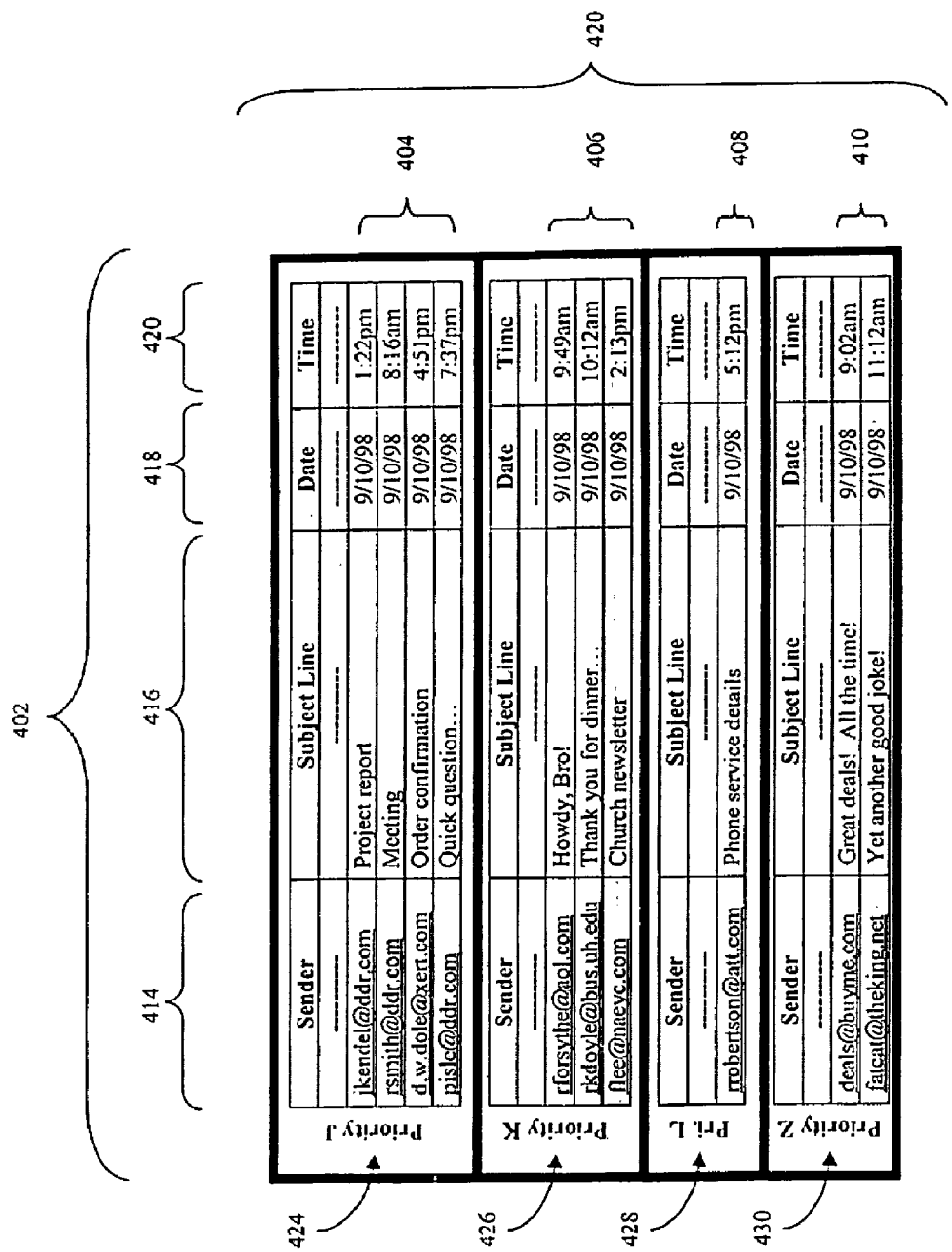
FIG. 10 illustrates the exemplary screen image as presented on the message recipient's (the user's 8) computer system of prioritized messages categorized in a plurality of virtual mailboxes and therein residing in sorted order of FIG. 7 with an alternative arrangement of the four categorical virtual mailboxes comprising the plurality of categorized virtual mailboxes.
Figure 12:
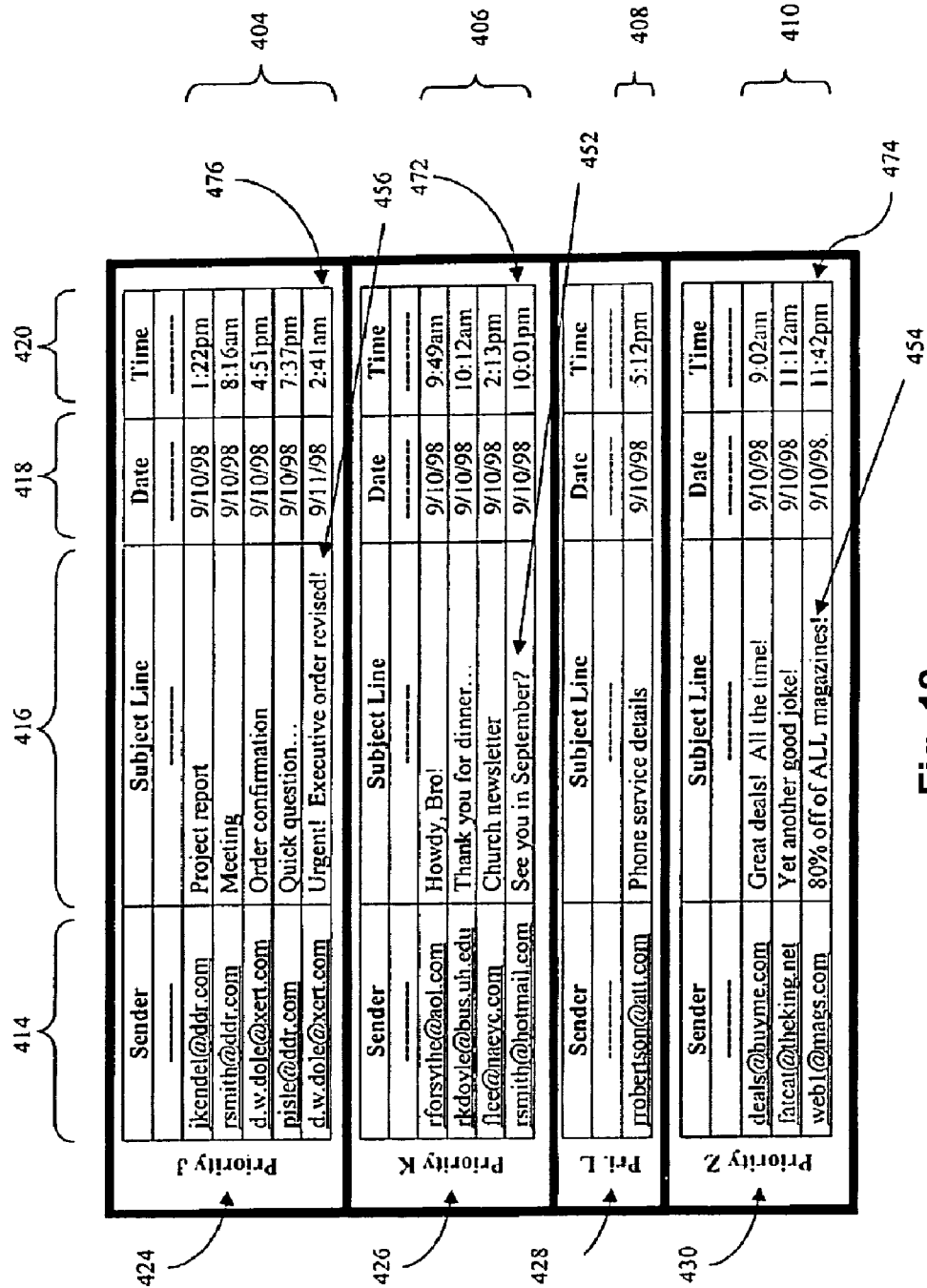
FIG. 12 illustrates the categorization and sorting of the three messages into the virtual mailbox of FIG. 10 in accordance with the categorization priorities of the new messages relative to the categories and priorities of the existing messages.

Referring to FIGS. 10, 11, and 12 collectively, the embodiment of FIGS. 7, 8, and 9 is here shown with an alternative arrangement of the four categorical virtual mailboxes 404, 406, 408, and 410 comprising the plurality of categorized virtual mailboxes 402. The description of FIGS. 10, 11, and 12 is otherwise identical to the description of FIGS. 7, 8, and 9.

Numerous alternatives and variations are possible in the embodiments described herein. For example, in an e-mail context, the user 8, by using the invention's prioritization schemes, may distinguish certain received communications for designated treatment and/or action. One possibility may be that the user 8 can act on particular communications by forwarding or sending a copy of the communications to another designated destination, such as another e-mail address, a voice-synthesized version to a telephone number, a "visual" version to a facsimile machine, or an actual hard copy version by mail to a post office address or equivalent. Alternatively, the user 8 could perform operations on or with the communication, for example, if the communication is data information for use in calculative processes. The user 8, furthermore, can have variable and multiple numbers of boxes or categories in which communications are maintained, and separate mailboxes or categories may be treated in a variety of different manners by the user 8. Another possibility may be that the sort, categorization, or prioritization functions may be performed based on alternative personalized identifiers other than an IP address, such as Internet domain name or other ascertainable characteristic of a received messages. This e-mail example is readily extendible to the other forms of messages as understood and appreciated by those skilled in the art.

Figure 14:
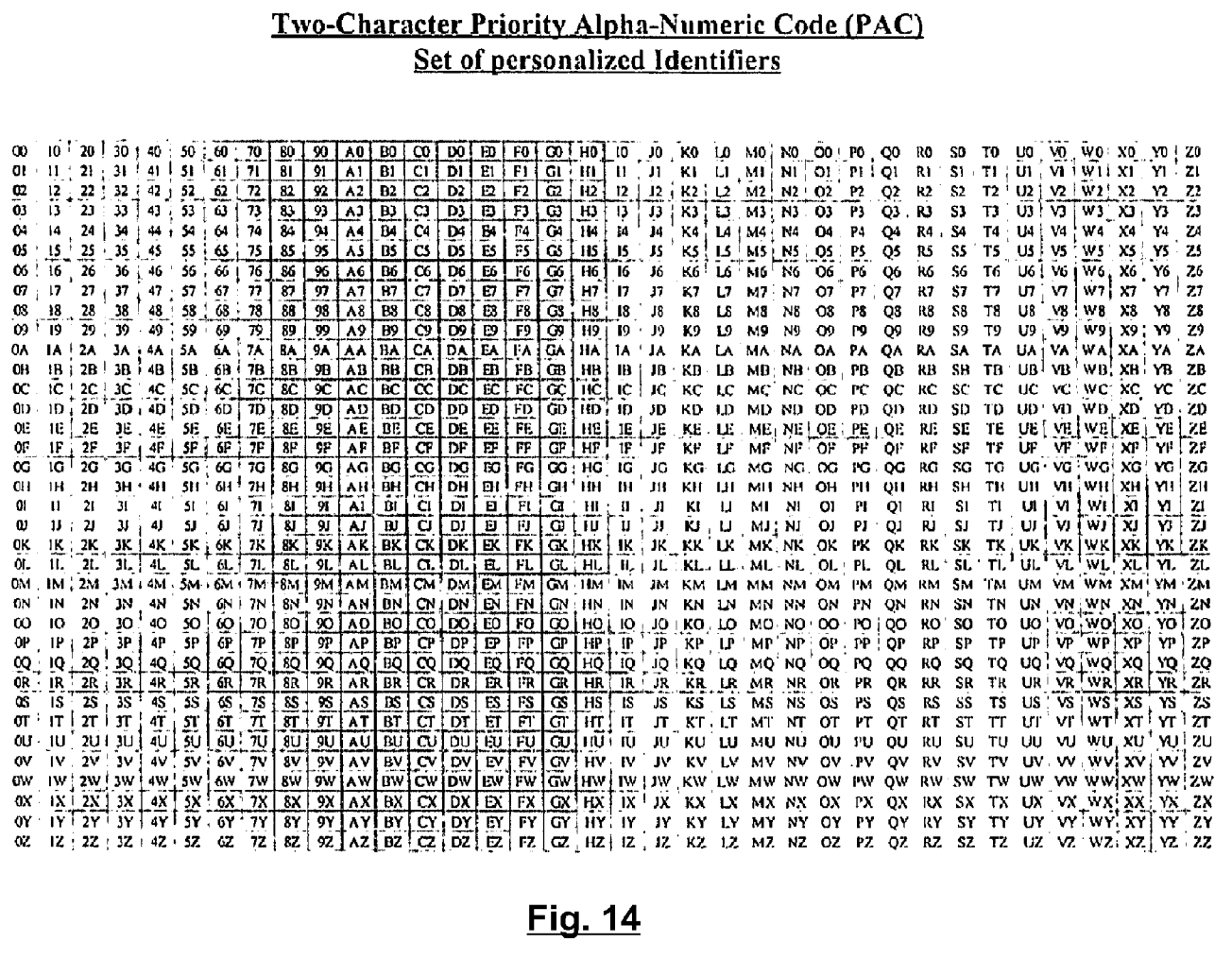

As will be appreciated, an embodiment of the invention may utilize, in order to achieve the desired prioritization or categorization for each situation, a "priority alphanumeric code" (PAC) to achieve prioritization. As used herein, a PAC may be an alphanumeric field which can be any size and can range from a single character to an infinite number of characters and, in many ways, may be similar to a PIN as earlier defined herein except that it need not be "personal" in nature, but can instead be situational or temporal in nature. The size of the PAC field may be determined by the extent of security and sorting desired in light of the relative ease of use. FIG. 13 illustrates the set of personalized identifiers available from using a single character priority alpha-numeric code (PAC). FIG. 14 illustrates the set of personalized identifiers available from using a two-character priority alpha-numeric code (PAC). A single character field PAC 502 may be limited to only 36 different possibilities 504—10 numeric and 26 alphabetic, and thus equivalent to a base-36 counting system—but this single-character PAC would be very easy for the user 8 to use and manage. However, by expanding the field to just two characters, the possible dual character field PACs 552 available increase exponentially to 36 raised to the 2nd power 554, thereby providing 1,296 possible combinations. Likewise, by expanding the field to four characters the possible PACs available increase to 36 raised to the 4th power-which is more than 1.6 million possible combinations (not shown)-and a six character field yields 36 raised to the $6^{th}$ power of possible combinations or just over 2 billion possible PACs (not shown). Thus the greater the size allowed for the PAC field, the greater security afforded because, for one reason, most of these PACs would not be used, and a hacker would have a more difficult time determining a valid PAC and the greater flexibility in variation of possible sort characteristics or categories, because of the number of priority levels available, albeit at the price of higher complexity in the PAC itself.

Priority sorting using a 5-character PAC, where each PAC also corresponds to its relative level of priority, provides a very detailed level of sorting. In one example, the following PAC priority sorting scheme provides superior prioritization and categorization of messages:

PAC # (using a base-36 numbering, system)
00000 to A1OZZ-(dead space)
A1 100 to A1 194-mail from executives
A1 195 to A1 1ZZ-(dead space)
A1200 to A1294-mail from customer services
A1295 to A12ZZ-(dead space)
A1300 to A1394-mail from warehouse, etc. . . .
A1395 to ZZZZZ-(dead space)

In effect, by assigning a PAC between A1 100 to A1 194 (e.g., executives) to a received message, that message would have a higher priority than a message with a PAC of A1200 to A1294 (e.g., customer service) or A1300 to A1394, and thereby could be sorted to the top of the list. A PAC of A1111 would have a higher priority than a message with a PAC of A1112 and would thereby be prioritized (e.g., sorted) higher up in the list. "Dead space" numbers that do not correspond to one of these three categories might be classified as "hacker" and deleted or as "unidentified" and treated accordingly. The user 8 might automatically assign a corresponding PAC or range of PACs to each of several virtual mailboxes, thereby categorizing each subset of PACs separately and establishing a limited two-dimensional sorting and categorization system. The user 8 might also designate a range of one-time PACs for individual, specific-instance uses. For example, the user 8 might use the series of numbers between BBOO1 and BBZZZ as one-time PACs (temp-PACs) that, once given out and used (i.e., replied to), would no longer be valid. If the sender 4 tried to use the same one-time PAC again, that message would automatically be rejected or assigned a lesser priority other than the one-time priority.

While PACs may have relative priorities as individualized as their unique numbers, as in the previous examples, these PACs might, in addition or instead, have categorized priorities. In the previous example, all of the "executive" PACs might have a priority of "A", all of the customer service PACs might have a priority of "B", and so forth. Thus, while the PACs may have individual PACs that would support absolute relative prioritization even among near PAC numbers, this is by no means necessary to the invention as categorized prioritization (a.k.a. group prioritization) may also be possible and may in fact be preferred.

In many regards, PACs can be viewed as an inverse form of the more commonly used personal identification number or PIN-such as those used for automatic teller machines (ATMs), debit cards, and for other purposes-the primary difference being that PINS are generally used to confirm authority to take, use, or receive something-such as cash at an ATM-whereas PACs would be employed to achieve priority and an audience for an accompanying message. In this regard, a PAC may therefore be a mechanism to employ "alphanumerics" in order to provide for millions of-possible combinations that also concurrently allow for sequencing or other specially-designated treatment.

In accordance with a further embodiment of the present invention, the sender 4 of the received message need not necessarily become aware that their message is being prioritized since the priority can be determined at the recipient's computer and be based on origin of the sender 4 (e.g., e-mail address, IP address or Caller-ID number) which may then be matched to the recipient computer's database and directed to the proper mailbox. Likewise, there are several ways that a PAC can be assigned to an anticipated sender of messages to appropriately prioritize a message when received by the user 8 without that sender's conscious knowledge of the prioritization if messaging software used by both parties is specifically developed to incorporate this functionality. This additional functionality will be readily appreciated and understood by those skilled in the art.

By way of example only, and in the context of e-mail messaging using specially designed software, a user 8 may solicit a response from a would-be sender 4 by first sending that party an e-mail message (from the user 8 to the would-be sender 4) incorporating a PAC as a "hidden" element of the message, said PAC then becoming automatically incorporated in any response to said user's 8 message. To accomplish this end, the user's 8 message can contain a space or field to designate a PAC, in which intended recipient's—here, the would-be sender 4—specific "Reply PAC" can be inserted either manually or automatically by cross-referencing the user's 8 database 14 with the intended recipient's (sender's 4) e-mail address.

Although the foregoing description primarily refers to a user's 8 computer as performing the prioritization or categorization of incoming messages via the PAC scheme, it should be understood that any computer in a network can perform the described functions in a myriad of alternative methodologies readily apparent to those skilled in the art. Any means and method that could adopt the "PAC" methodology of scrutinizing or prioritizing in accordance with the foregoing descriptions or similar procedures are thereby included as part and parcel of the present invention. Likewise, to the extent that any of the functionality described herein can occur on the server computer, or be distributed across any number of computers, but still attain the same or similar result, those elements are also included in and anticipated by the present invention. Furthermore, as the foregoing analysis can also apply to other message types, this analysis is likewise applicable to the present invention for these other types as readily appreciated by those skilled in the art.

It is to be understood that multiple variations, changes and modifications are possible in the aforementioned embodiments of the invention. Although illustrative embodiments of the invention have been shown and described, a wide variety of modification, change and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims. While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for an electronic communications message system to prioritize a message, comprising:
   determining, by the system, a personalized identifier corresponding to the message, wherein the personalized identifier comprises a priority alphanumeric code (PAC) designated for a one-time use;
   obtaining from a database, by the system, a priority code based on the PAC;
   assigning, by the system, the obtained priority code to the PAC; and
   depositing the message, by the system, into at least one of a plurality of mailboxes wherein the message is prioritized within the at least one of the plurality of mailboxes according to the priority code;
   invalidating, by the system, the PAC after the PAC has been employed to prioritize the message according to the priority code.

2. The method of claim 1, further comprising:
   defining, by the system, a priority hierarchy corresponding to the plurality of mailboxes; and
   wherein the at least one of the plurality of mailboxes is selected based upon the priority hierarchy.

3. The method of claim 1, wherein the personalized identifier is based upon an internet protocol (IP) address associated with the message.

4. The method of claim 1, wherein the personalized identifier is based upon biometric data transmitted in conjunction with the message.

5. The method of claim 1, wherein the personalized identifier is based upon information that does not require coordination between a sender of the message and a recipient of the message.

6. The method of claim 1, further comprising:
   transmitting, by the system, the PAC in conjunction with the message.

7. The method of claim 6, wherein the PAC can-not be reused.

8. The method of claim 1, wherein the message is a response to a first message transmitted by the system, the first message including the PAC as a hidden element of the first message, wherein the PAC is configured to be automatically incorporated into any message transmitted in response to the first message.

9. The method of claim 1, wherein the message includes an e-mail message converted to a voicemail message.

10. The method of claim 1, wherein the message is a voicemail message sent in response to an invitation to send the voicemail message in conjunction with an entry of a numeric identification number entered by a phone to be inserted at a beginning or at an end of the voicemail message.

11. The method of claim 1, wherein the system is a multi-message system that consolidates messages from varying message sources including e-mail, voicemail, and facsimile into a single system of a single message type.

12. An electronic communications message prioritization system, comprising:
   storage to provide a plurality of mailboxes;
   logic to locate a personalized identifier in a database, wherein the personalized identifier comprises a priority alphanumeric code (PAC) designated for a one-time use;
   logic to assign from the database a priority code corresponding to the PAC; and
   logic to deposit a message having a corresponding personalized identifier into at least one of the plurality of mailboxes wherein the message is prioritized within the at least one of the plurality of mailboxes; and
   logic to invalidate the PAC after the PAC has been employed to prioritize the message.

13. The system of claim 12, wherein
   the plurality of mailboxes have an associated priority hierarchy; and
   the system further comprises logic to choose the at least one mailbox based upon the priority hierarchy.

14. The system of claim 12, wherein the personalized identifier is based upon an internet protocol (IP) address associated with the message.

15. The system of claim 12, wherein the personalized identifier is based upon biometric data transmitted in conjunction with the message.

16. The system of claim 12, wherein the personalized identifier is based upon information that does not require coordination between a sender of the message and a recipient of the message.

17. The system of claim 12,
   wherein the PAC is transmitted in conjunction with the message.

18. The system of claim 17, wherein the logic to invalidate the PAC includes logic to ensure that the PAC cannot be reused.

19. An article of manufacture, comprising:
   a computer-readable non-transitory storage memory; and
   instructions stored therein, and configured to enable an apparatus, in response to execution of the instructions, to perform operations including:
      locating a personalized identifier in a database, wherein the personalized identifier comprises a priority alphanumeric code (PAC) designated for a one-time use;
      assigning from the database a priority code corresponding to the PAC;
      depositing a message having a corresponding personalized identifier into a mailbox, wherein the message is prioritized within the mailbox;
      invalidating the PAC after the PAC has been employed to prioritize the message.

20. The article of claim 19, wherein the operations further comprise:
   choosing the mailbox based upon a priority hierarchy corresponding to a plurality of mailboxes.

21. The article of claim 19, wherein the personalized identifier is based upon an internet protocol (IP) address associated with the message.

22. The article of claim 19, wherein the personalized identifier is based upon biometric data transmitted in conjunction with the message.

23. The article of claim 19, wherein the personalized identifier is based upon information that does not require coordination between a sender of the message and a recipient of the message.

24. The article of claim 19, wherein
   the priority alphanumeric code (PAC) is transmitted in conjunction with the message.

* * * * *

UNITED STATES PATENT AND TRADEMARK OFFICE
CERTIFICATE OF CORRECTION

| | | |
|---|---|---|
| PATENT NO. | : 7,961,853 B2 | |
| APPLICATION NO. | : 11/417817 | |
| DATED | : June 14, 2011 | |
| INVENTOR(S) | : Voticky et al. | |

It is certified that error appears in the above-identified patent and that said Letters Patent is hereby corrected as shown below:

Column 14, line 51, in Claim 7, delete "can-not" and insert -- cannot --.

Signed and Sealed this
Twenty-seventh Day of September, 2011

David J. Kappos
*Director of the United States Patent and Trademark Office*